Feb. 6, 1951      R. R. WHITLEY      2,540,361
ADJUSTABLE LEVEL CONTROL

Filed Dec. 22, 1945

Inventor
Record R. Whitley
By E. V. Hardway
Attorney

Patented Feb. 6, 1951

2,540,361

UNITED STATES PATENT OFFICE 2,540,361

ADJUSTABLE LEVEL CONTROL

Record R. Whitley, Texas City, Tex.

Application December 22, 1945, Serial No. 637,043

4 Claims. (Cl. 137—68)

This invention relates to an adjustable level control.

An object of the invention is to provide means for controlling the level of liquid in a liquid container. The container may be a closed container or it may have an inlet for receiving additional liquid.

Another object of the invention is to provide a liquid level control which may be readily adjusted so that the level of the liquid in the container may be maintained at any desired level.

It is a further object of the invention to provide a liquid level control which includes an adjustable weight mounted on the float stem which may be adjusted in accordance with the buoyancy.

With the above and other objects in view the invention has particular relation to certain novel features of construction, operation and arrangement of parts, an example of which is given in this specification and illustrated in the accompanying drawings wherein.

Figure 1:
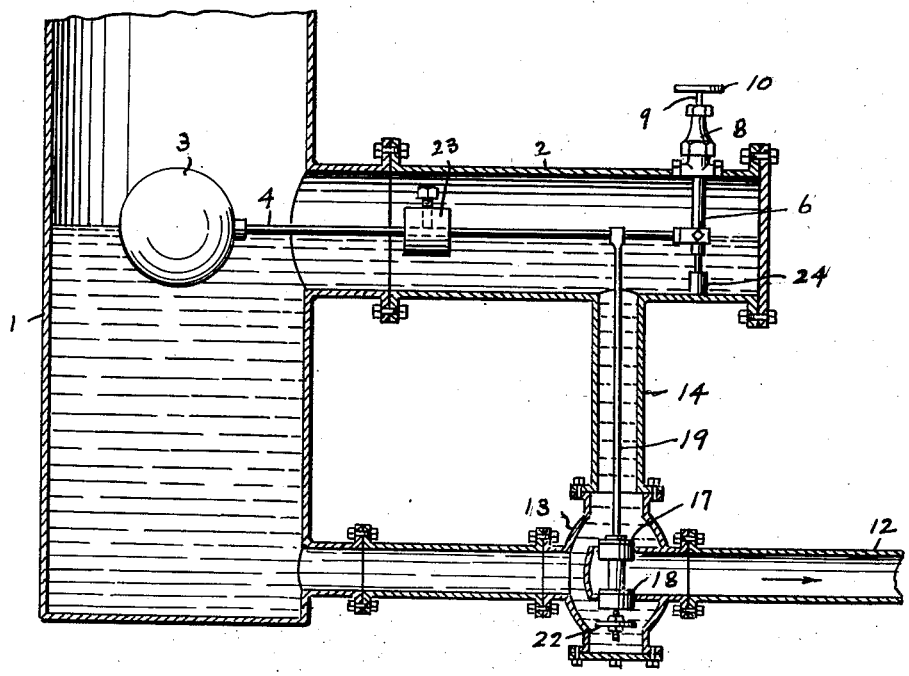
Figure 1 is a vertical sectional view of the controlling device.

Referring now more particularly to the drawings wherein like numerals of reference designate the same parts in each of the figures the numeral 1 designates a liquid container. This may be a closed container or may have an inlet for receiving additional liquid. Extending laterally from the container there is a tubular arm 2 whose outer end is closed. This arm is at an elevation to be partly filled with the liquid from the container.

A float 3 rides on the level of the liquid, as shown, and is fixed to one end of the float stem 4, which extends into the arm 2. The other end of this stem has a yoke 5 fixed thereon whose arms embrace an adjusting rod 6. The yoke is pivotally connected to said rod by means of the connecting pins 7, 7.

Mounted on the arm 2 there is a tubular fitting 8 into which the upper end of the rod extends and mounted in this fitting there is a hand wheel shaft 9 whose upper end has a hand wheel 10 fixed thereon.

The lower end of the shaft 9 is threaded into an internally threaded socket 11 extending axially into the rod 6. By turning the shaft 9 the rod 6 and the corresponding end of the stem 4 may be adjusted up and down.

Leading outwardly from the bottom of the container 1 there is a relief pipe 12, incorporated into which there is a valve casing 13 which is connected into the arm 2 by a tube 14.

In the casing 13 there are the upper and lower valve seats 15, 16 through which the liquid flowing through the relief pipe 12 must pass. These seats are controlled by the upper and lower disc valves 17, 18 which are arranged above the corresponding seats 15, 16 and which are fixed on a valve stem 19 within the tube 14 and whose upper end is connected to the float stem 4.

Depending from the respective valves 17, 18 are the annular skirts 20, 21 which work in the respective seats 15, 16 and form guides for the valves. The lower margins of these skirts are deeply serrated so that when the valves are in upper position, or opened, the liquid may flow through the seats.

The valve stem 19 extends beneath the lower seat 16 and fixed on said extending end there is a perforated disc 22 forming a stop to limit the upward movement of the valves. The guides 20, 21 serve to keep the valves properly lined with their respective seats.

Should the level of the liquid in the container 1 rise above the desired level the balanced valve mechanism, above described, will be opened and the excess liquid will be released through the pipe 12 and when the desired level is reached the valve will close.

Should it be desired to change the level at which the liquid is to be maintained this may be readily done by adjusting the rod 6 and the corresponding end of the stem 4 upward or downward.

There is an adjustable weight 23 on the float stem which may be adjusted along said stem in accordance with variance of the buoyancy of the liquid in the container 1.

Figure 3:
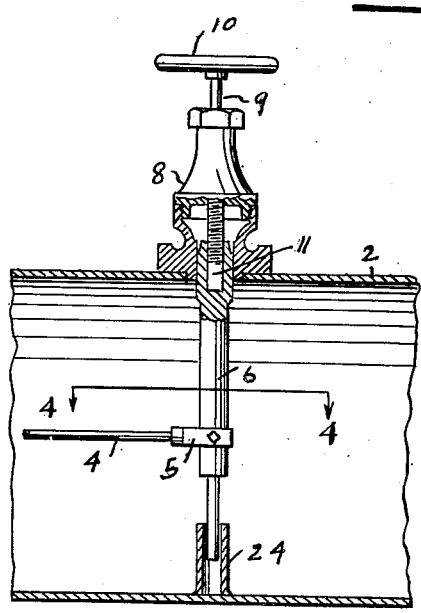
Figure 3 is an enlarged vertical sectional view of the adjusting mechanism.
Figure 2:
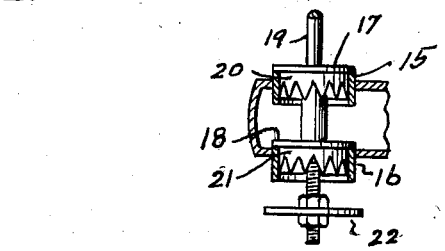
Figure 2 is an enlarged sectional view of the balanced valve mechanism.
Figure 4:
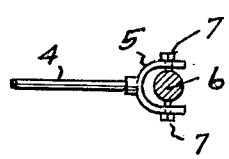
Figure 4 is a fragmentary sectional view taken on the line 4—4 of Figure 3.

In order to assure the true vertical movement of the adjusting rod 6 its lower end is reduced and works in an upstanding tubular guide in the bottom of the arm 2, as shown in Figure 3.

The drawings and description are illustrative merely while the broad principle of the invention will be defined by the appended claims.

What I claim is:

1. An adjustable level control comprising, a container, a closed tubular arm extended laterally from the container, an outlet pipe leading from the container beneath said arm, an outlet valve casing incorporated into the outlet pipe and containing an outlet valve, a reduced tube directly connecting said arm and valve casing, a float in the container, a float stem one end of which is connected to the float, a vertically adjustable anchor to which the other end of the stem is connected, said anchor including a vertically disposed member in the arm and means in the arm cooperable with the member to maintain the member vertical; and a valve stem in said tube connected, at one end, to the valve and at its other end to the float stem between the float and anchor.

2. An adjustable level control comprising, a container, a closed tubular arm extended laterally from the container, an outlet pipe leading from the container beneath said arm, an outlet valve casing incorporated into the outlet pipe and containing an outlet valve, a reduced vertical tube connecting said arm and valve casing, a float in the container, a float stem one end of which is connected to the float, a vertically adjustable anchor to which the other end of the stem is connected, said anchor including a vertically disposed rod extending into the arm and means in the arm cooperable with the rod to maintain the rod vertical; and a valve stem in said tube connected, at one end, to the valve and at its other end to the float stem between the float and anchor and an adjustable weight on the float stem.

3. An adjustable level control comprising, a container for liquid having a reduced laterally extended, tubular, closed arm, an anchor therein, including a vertically disposed rod, means at one end of the rod for adjusting said rod vertically, means in the arm cooperable with the other end of the rod for maintaining the rod vertical, a float in the container, a float stem connected, at one end, to the float and at its other end to said anchor, an outlet pipe leading from the container beneath said arm, a reduced vertical tube connecting said arm and outlet pipe, a balanced valve for controlling the flow of liquid through said pipe and a valve stem within the tube and connected, at one end, to said valve and at its other end to the float stem between the anchor and float.

4. An adjustable level control comprising, a container having a reduced, cylindrical laterally extended closed arm, a float stem in said arm, a float in the container connected to one end of said stem, a yoke on the other end of said stem having spaced arms, a vertical adjusting rod embraced by the arms of said stem and pivotally connected thereto, a tubular fitting mounted on said laterally extended arm into which the upper end of said rod extends, a hand wheel shaft mounted on said fitting and whose lower end has a threaded connection with the upper end of the rod, means for rotating said hand wheel shaft, a tubular guide within and secured to said laterally extended arm, the lower end of said adjusting rod being reduced and fitted into said guide, a relief pipe leading outwardly from the bottom of the container, a valve casing incorporated into the relief pipe, a tube connecting said valve casing and the bottom of said laterally extended arm, a valve within said valve casing and controlling the flow of fluid through the relief pipe and a valve stem connected, at its lower end, to the valve and working through said tube and whose upper end is connected to the float stem.

RECORD R. WHITLEY.

REFERENCES CITED

The following references are of record in the file of this patent:

UNITED STATES PATENTS

| Number | Name | Date |
|---|---|---|
| 398,778 | Gunckel | Feb. 26, 1889 |
| 1,015,453 | Mosely | Jan. 23, 1912 |
| 1,663,411 | Little | Mar. 20, 1928 |
| 2,264,845 | How | Dec. 2, 1941 |